(12) United States Patent
Shilane et al.

(10) Patent No.: US 10,289,549 B1
(45) Date of Patent: May 14, 2019

(54) CHECKPOINTING CACHE STATUS INFORMATION

(71) Applicant: EMC IP Holding Company LLC, Hopkinton, MA (US)

(72) Inventors: Philip N Shilane, Newtown, PA (US); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 15/195,919

(22) Filed: Jun. 28, 2016

(51) Int. Cl.
*G06F 12/0804* (2016.01)
*G06F 12/0875* (2016.01)
*G06F 12/0891* (2016.01)
*G06F 12/123* (2016.01)
*G06F 12/0893* (2016.01)
*G06F 3/06* (2006.01)
*G06F 9/4401* (2018.01)

(52) U.S. Cl.
CPC .......... *G06F 12/0804* (2013.01); *G06F 3/065* (2013.01); *G06F 3/0619* (2013.01); *G06F 3/0632* (2013.01); *G06F 3/0647* (2013.01); *G06F 3/0685* (2013.01); *G06F 9/4406* (2013.01); *G06F 12/0875* (2013.01); *G06F 12/0891* (2013.01); *G06F 12/0893* (2013.01); *G06F 12/123* (2013.01); *G06F 2212/1032* (2013.01); *G06F 2212/222* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 8,010,738 B1 * | 8/2011 | Chilton | G11C 16/349 711/103 |
| 9,304,914 B1 | 4/2016 | Douglis et al. | |
| 2003/0018877 A1 * | 1/2003 | Gaskins | G06F 12/1027 711/207 |
| 2010/0250833 A1 * | 9/2010 | Trika | G06F 11/1441 711/103 |
| 2012/0131320 A1 * | 5/2012 | Park | G06F 9/4401 713/2 |
| 2014/0351523 A1 * | 11/2014 | Samanta | G06F 3/06 711/130 |
| 2016/0155491 A1 * | 6/2016 | Roberts | G11C 11/40607 711/106 |
| 2017/0257513 A1 * | 9/2017 | Matsumoto | G06F 3/0608 |

* cited by examiner

*Primary Examiner* — Sean D Rossiter
*Assistant Examiner* — Charles J Choi
(74) *Attorney, Agent, or Firm* — Staniford Tomita LLP

(57) ABSTRACT

Embodiments are directed to maintaining cache status information for a flash-based cache after a system restart following a shutdown by periodically gathering the cache status information from one or more data structures in volatile memory, compiling the gathered cache status information into a checkpoint data structure stored in non-volatile memory, and upon the system restart, loading the checkpoint data element into the one or more data structures in volatile memory to restore the cache status information to a state just prior to the shutdown to maintain warmness of the cache across the restart. The restored cache status information is used by the system to make informed write eviction decisions to maintain correctness of the system after the restart relative to the state just prior to the shutdown.

17 Claims, 8 Drawing Sheets

CHECKPOINTING CACHE STATUS INFORMATION

TECHNICAL FIELD

Embodiments are generally directed to cache memory, and more specifically to maintaining cache status information across system restarts.

BACKGROUND

In computer systems, flash memory-based cache (flash cache) is used to store previously requested data on non-volatile (e.g., NAND) flash memory chips so that it can be quickly retrieved when it is needed again, thereby enabling requests for data to be met with greater speed. A computer system typically stores a temporary copy of the most active data in the flash cache and a permanent copy of the data on a hard disk drive (HDD). Thus, flash caches are often used in tandem with slower hard disk drives (HDDs) to improve data access times. The NAND flash cache is typically implemented on a solid-state drive (SSD), though other types of devices (e.g., PCI Express card or a DIMM-based flash device) are also used.

One advantage of using SSD for caching is that the data is stored persistently across system restarts. This means that the cache can remain in a "warm" state across restarts, which accelerates client accesses immediately without the typical warming period needed by caches on volatile storage such as DRAM. To make cache data truly usable, though, there is cache status information that must be maintained across system restarts as well. Updating cache status information on every access is not practical, because writing to flash on every update uses SSD I/O cycles for status updates instead of serving data to clients. Also, frequent writes will use up limited erasures supplied by the flash device.

What is needed, therefore, is a method that maintains warmness of the cache without causing many erasures to SSD memory devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
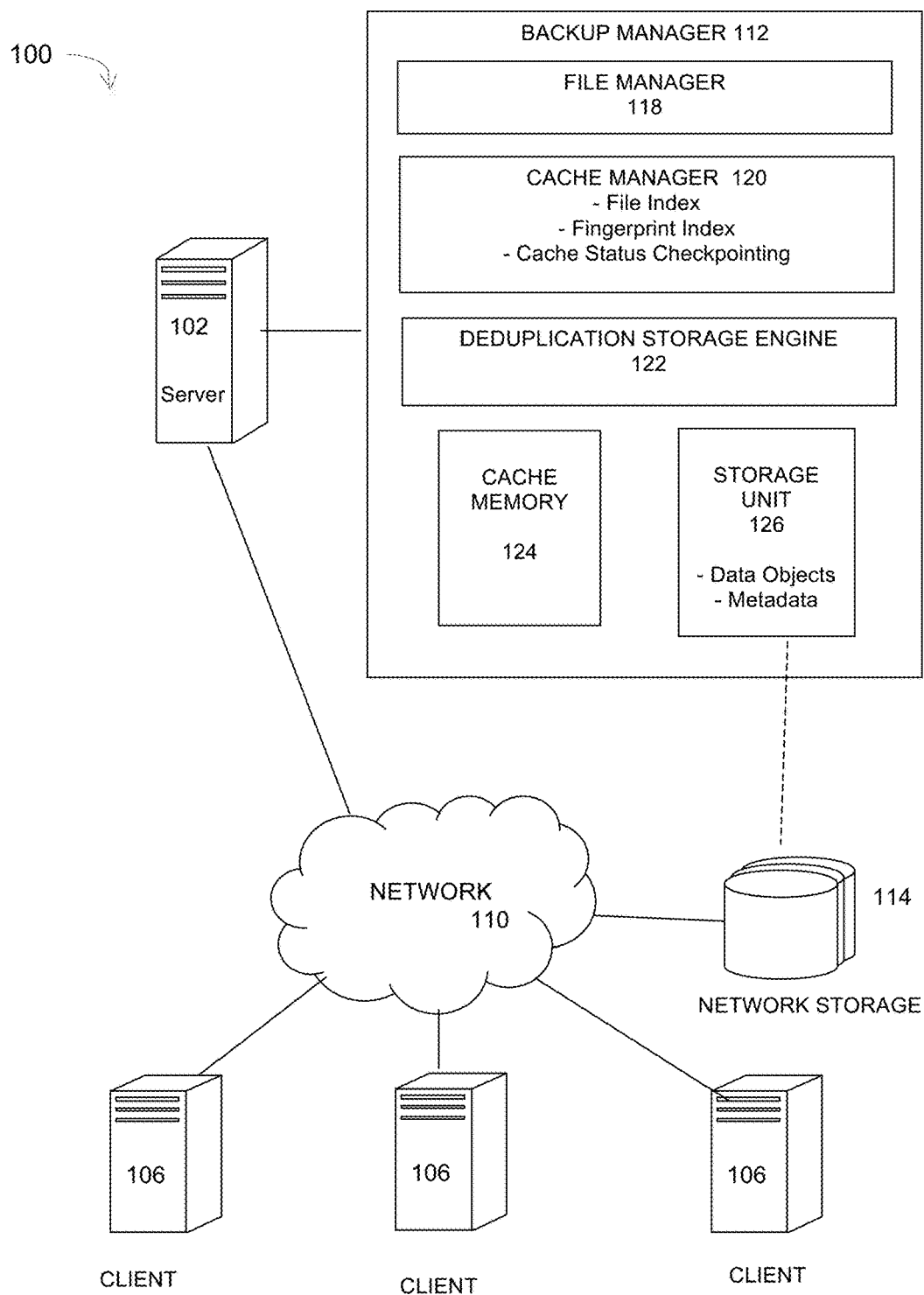
FIG. 1 is a diagram of a computer network implementing checkpointing of cache status information, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks) or SANs (storage area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale network implementing a checkpointing scheme for cache status information, under some embodiments. As shown in FIG. 1, one or more client computers 106 are coupled to a storage system and server computer 102 over network 110. The clients 106 may be any type or class of device such as a server, a personal computer, a thin client, a personal device, a web-enabled appliance, a game/media player, tablet computer, mobile phone, and so on. Alternatively, any of the clients may be a primary storage system that provides storage to other local clients, which may periodically backup their content to a backup storage system, such as network storage 114.

Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants).

The data generated or sourced by system 100 may be stored in any number of persistent storage locations and devices, such as local client storage or network storage 114. This storage resource may at least be partially implemented through storage device arrays, such as RAID components. In an embodiment network 110 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices.

In system 100, a backup server 102 executes a backup management process 112 that coordinates or manages the backup of data from one or more data sources to storage devices, such as network storage 114, client storage, and/or virtual storage devices. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. A data storage deployment may use any combination of these interfaces simultaneously to store and access data.

In an embodiment backup manager 112 includes, but is not limited to, functional processes or components that include a file manager 118, cache manager 120, a deduplication storage engine 122, cache memory 124 (or an interface to external cache memory), and storage unit 126 (or an interface to external storage units). Storage unit 126 and cache 124 may represent any number of like units, and may be implemented locally (e.g., a single node operating environment) or remotely (e.g., a multi-node operating environment). Storage unit 126 may comprise the network storage 114 or any other local or network-based storage device or array. The cache memory 124 may be volatile or non-volatile devices, and the terms "cache memory device" and "cache" may be used interchangeably throughout the specification.

File manager 118 provides an interface to access filed stored in storage unit 126 and cache 124. Cache manager 120 contains certain other components such as a file index, fingerprint (FP) index, and a cache status information (or cache eviction state) checkpointing process.

For storing file data in storage unit 126, deduplication storage engine 122 is configured to segment the file data into multiple segments according to defined rules. It may choose not to store a segment if it has already been stored in the storage unit. If the data segment itself is not stored, deduplication engine 122 stores metadata enabling the reconstruction of the file using the previously stored segment. As a result, data is stored in a deduplicated manner with one copy of the data segments and metadata that includes enough information to provide access to these segments as necessary. The metadata may include a file name and storage unit identifier indicating where the segments associated with the file name are stored, along with reconstruction information for the file using the segments, and any other appropriate information that can be encoded as metadata.

With respect to the cache manager 120 and cache memory operations, the cache 124 is a data structure in memory that holds some values (e.g., memory pages, disk blocks, etc.) for faster lookups. It works by storing some kind of short references in fast search data structure (e.g., hash table, B+ Tree, etc.) or faster access media (e.g., RAM first, then SSD, then HDD). To do this fast search, the cache must be able to hold values. A cache that is empty is commonly called "cold" cache since it does not provide any fast access benefit as I/O operations still require disk access; while a cache that contains some values and provides cache hits is referred to as a "warm" cache.

For cache manager 120, the file index is used to access data cached in cache memory 124. The fingerprint index is used to deduplicate the data stored in the cache. When data objects, such as those in storage unit 126 are accessed in storage unit 126 the data may be cached in cache memory 124. In response to receiving a request to cache a file extent of a file, its fingerprint is generated and used by cache manager 120 to look up in the fingerprint index to determine whether any fingerprint entry matching the fingerprint is found. If so, that means the corresponding data has already been stored in the cache memory 124 as a file extent. The file is associated with the storage location that caches the file extent by creating or inserting the file extent entry into the file index.

In an embodiment, cache manager 120 uses certain insertion and eviction policies to determine which file extents should be kept in the cache and referenced by the file index. A bitmap structure may be used to indicate validity or invalidity of data blocks within the file extent. In this case, each node includes a bitmap having a number of bits, each corresponding to one of the data blocks within the corresponding extent associated with the node. A first bit setting (e.g., "1") indicates that the data is valid, and the second bit setting (e.g., "0") indicates that the data is invalid.

In an embodiment, the file extents cached in cache memory 124 are compressed into a write-evict unit (WEU) together with some other file extents from the same file or different files. The WEU is then stored in cache 124. The size of a WEU may match an erasure unit size of that particular cache memory. When storing data into the cache memory, an entire WEU is written or evicted to improve the lifespan of the cache memory device itself.

Figure 2:
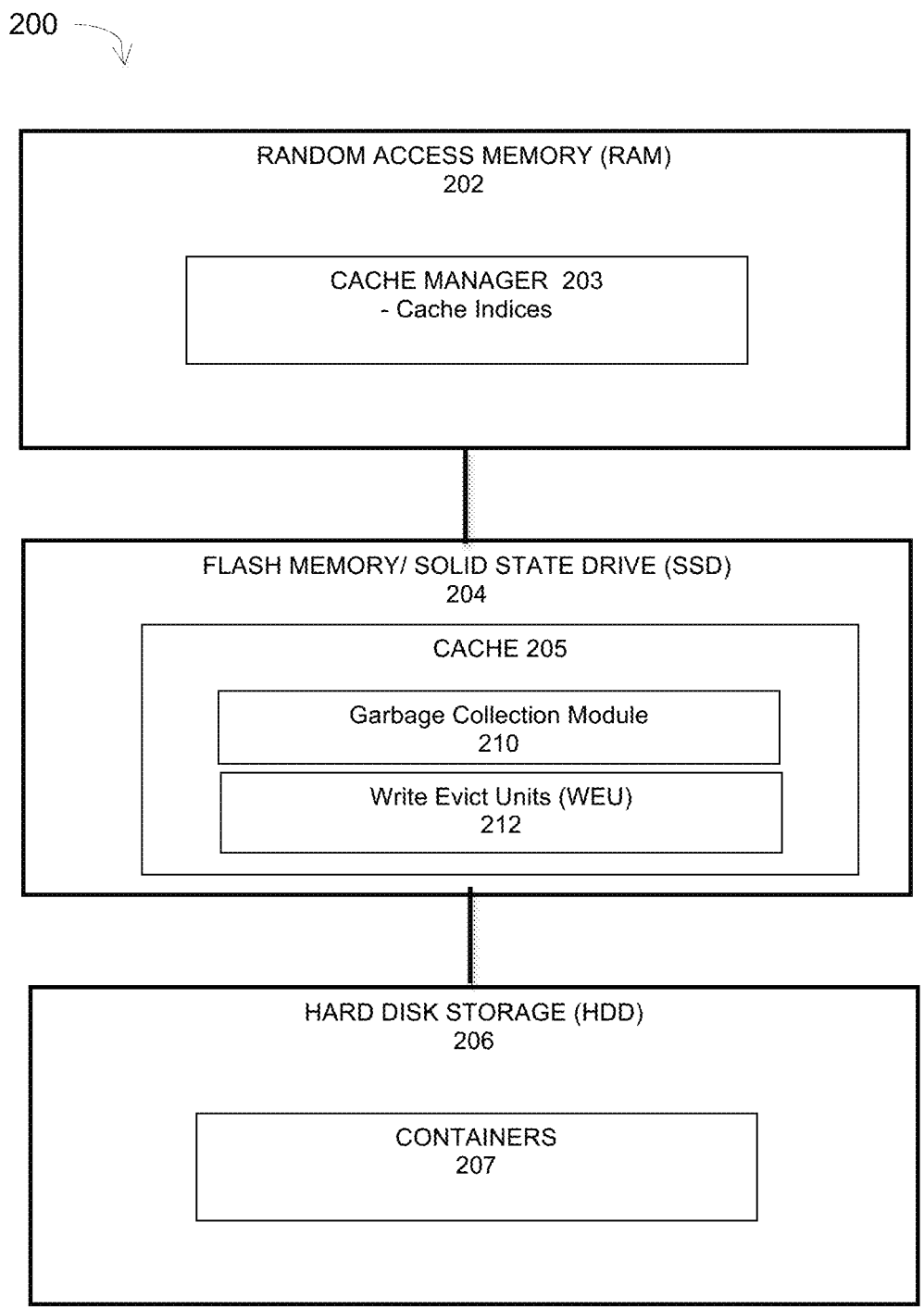
FIG. 2 illustrates a memory architecture for a cache manager and cache storage device under some embodiments.

FIG. 2 illustrates a memory architecture for a cache manager and cache storage device under some embodiments. In FIG. 2 the main processing or functional components are distributed among three main types of memory: RAM 202, Flash or SSD 204, and hard disk 206. Each has certain characteristics that dictate their optimum use in a system, for example RAM 202 is very high performance but is volatile, while disk storage 206 is relatively cheap and reliable for long-term storage but slow, while flash 204 is fast and non-volatile but has a limited lifetime. At the bottom layer of the architecture 200, disk storage 206 is implemented using HDD devices for large capacity and has containers 207 to store data files that contain segmented chunks of data after deduplication. It may also store other data elements, such as file handles, fingerprints, and so on. The upper layer of architecture 200 is RAM memory 202, which may be part of system memory of the server 102. Typically this memory is volatile and contains the cache manager 203, which uses the cache 205 to accelerate read/write (R/W) operations to the HDD 206.

The cache 205 is maintained in the flash memory or SSD 204. In the cache, data is stored and evicted using write evict units 212. Garbage collection module 210 is configured to evict WEUs no longer needed and free space to cache WEUs for new requests. For the embodiment in which the cache is maintained in flash or SSD 204, certain device constraints must be considered. These include the fact that a flash storage unit must be explicitly erased before being overwritten, and the unit of erasure (e.g., up to MBs in size) is much larger than the unit of individual writes in a disk storage (e.g., 4 KB). In addition, writes wear the flash storage over time and therefore, less writing is desirable. In general flash memory manufacturers usually specify the lifetime of their devices in terms of number of writes per day (W/D), and this rating effectively limits the erasures that the drive can tolerate before they burnout and fail. Typical present ratings are on the order of 3 writes/day, which in a certain operating environment may yield a lifetime of 3-4 years, while newer devices are featuring ratings on the order of 1 write per day, which will significantly shorten their life spans.

Figure 3A:
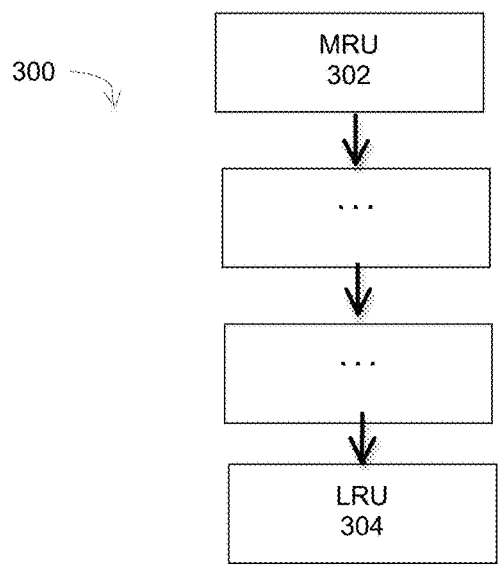
FIG. 3A illustrates a data structure for an eviction algorithm used on WEUs in a cache management process under some embodiments.

Caches implement certain caching algorithms to discard information that will likely not be needed for the longest time in the future. Several different methods can be used to try to achieve this ideal result. One such algorithm is the Least Recently Used (LRU) method, which is often a default method. In this method, the oldest element is the Less Recently Used (LRU) element. The last used timestamp is updated when an element is put into the cache or an element is retrieved from the cache with a get call, and this element becomes the Most Recently Used (MRU) element. FIG. 3A illustrates a data structure for an LRU eviction algorithm used on WEUs in a cache management process under some embodiments. In structure 300, the MRU entry 302 with the latest time stamp is shown above intermediate entries down to the LRU entry with the oldest time stamp. The LRU list basically tracks the status of WEUs or segments in flash memory. In alternative embodiments, other eviction data structures and algorithms can be used such as Least Frequently Used (LFU), which is the element with the least number of accesses, or the First-In-First-Out, in which elements are evicted in the same order as they come in.

Figure 3B:
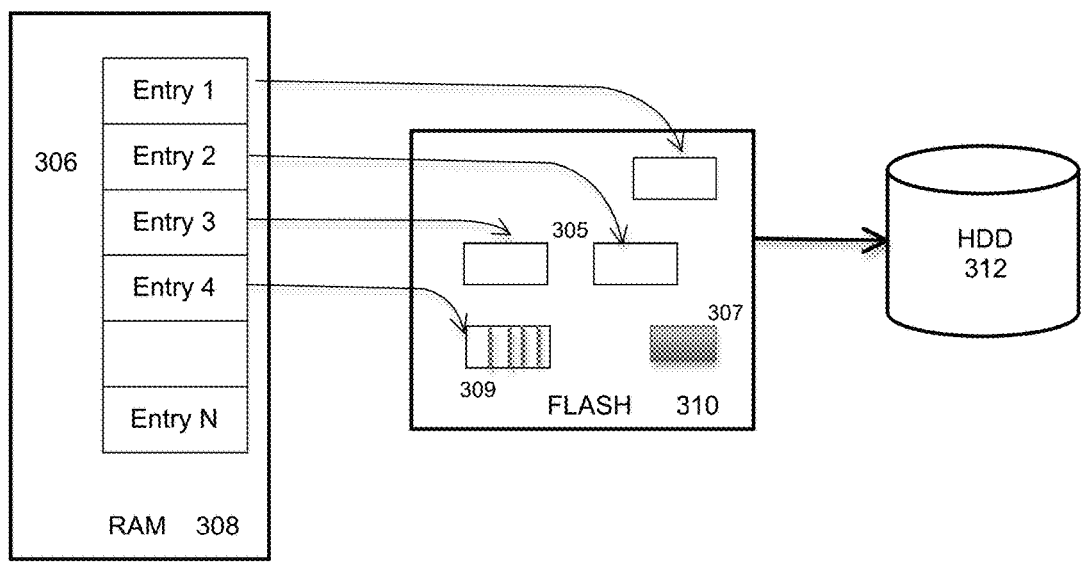
FIG. 3B illustrates example operation of an eviction algorithm used on WEUs in a cache management process under some embodiments.

FIG. 3B illustrates example WEUs in flash memory and a corresponding index mapping scheme to data locations in flash. As shown in FIG. 3B the index mapping data structure comprises a table 306 stored in RAM (e.g., as part of the cache manager) with a number of entries (denoted 1 to N), and which implements the LRU algorithm 300. Each entry locates a corresponding WEU 305 of a certain size (e.g., 1 MB) stored in flash memory 310. WEUs that are totally darkened, such as 307 contain totally invalidated content, while those that are striped, such as 309 contain some invalidated content. The stripe pattern is meant to represent the bitmap structure of the WEU with the light/dark bit state corresponding the valid/invalid status of the flash content. FIG. 3B is intended to illustrate an example configuration and function of the flash cache to maintain high overall performance relative to slow HDD 312 accesses. Since the cache manager and certain important cache configuration information, such as index table 306 is maintained in RAM, it is lost upon system restarts, such as power on/off cycles or shutdowns due to failure, maintenance, non-live updates, tests, and so on. To maintain data correctness and system performance, important flash status information, must be preserved across system restarts. In present systems, certain information such as index 306 must be rebuilt upon restart, and in certain cases there is no effective way to recreate the LRU table, which is presently rebuilt from an empty state through often very lengthy memory access periods. Upon RAM power down and restart, the information that is lost can be extensive configuration information, such as valid/invalid data (e.g., the state of WEUs such as 309 and 307), LRU status, access counts, priority status, and other information.

To maintain this information across system restarts, a checkpoint-based technique is used. Since it is non-volatile, using flash or SSD memory 204 for the cache allows data to be stored persistently across system restarts. This allows the cache to remain warm across restarts, thereby accelerating client accesses immediately after the restart and not incurring the long warming period required for RAM. In an embodiment, the cache manager process includes a technique of maintaining cache status across restarts using a checkpointing technique that effectively maintains the cache status as if they were written immediately to flash, but without actually constantly writing to the flash and thus causing a high erasure rate and shortening the device life span.

As shown in FIG. 1, the cache manager 120 of the data backup manager process 112 executed by server 102 includes a cache status checkpointing process that checkpoints certain cache status information. In general, there are multiple types of cache status information that may be updated in memory. Table 1 below shows the cache status properties that are checkpointed, under an embodiment.

TABLE 100

| 11 | DATA VALID/INVALID |
| 12 | LRU STATUS/TIMESTAMPS |
| 13 | ACCESS COUNTS |
| 14 | PRIORITY STATUS OF FILES/DATA |
| 15 | DUPLICATE COUNT |

The data valid/invalid status (table entry 11) indicates the correctness of the data. When a client overwrites or deletes data, it may still exist in the cache for a period of time. This may occur because a segment (e.g. 8 KB) may be part of a larger storage structure, such as a 1 MB WEU, written as a whole to SSD. For this reason, the process could mark a segment as invalidated with an in-memory structure such as a bitmap, with a single bit per cache entry. If the client later tries to read back the same data previously invalidated, it is a mistake to return the data, and a cache miss should be the result. In some embodiments, such as when the cache is indexed by fingerprints, the data referenced by the entry may still be valid (it is the correct data associated with the fingerprint) but if marked as invalid it indicates it will likely not be used again such as after a file containing the data has been deleted.

The LRU status (table entry 12) tracks the last access time for Write Evict Units (WEUs) and has a policy to evict the least-recently-used WEU. The access counts (table entry 13) tracks the number of accesses (or the segment access frequency) of the data. This accounts for older data that is more frequently accessed.

The priority status (table entry 14) is based on a process that maintains priority information for data in the cache. In an example implementation, the process tracks the association of segments with client files. A defined priority policy is used to indicate that certain files will have higher priority in the cache than others; for example, files added to the cache as part of an instant restore or instant access are assigned higher priority than standard backups. Data associated with higher priority files should remain in the cache longer than data associated with lower priority files.

Figure 4:
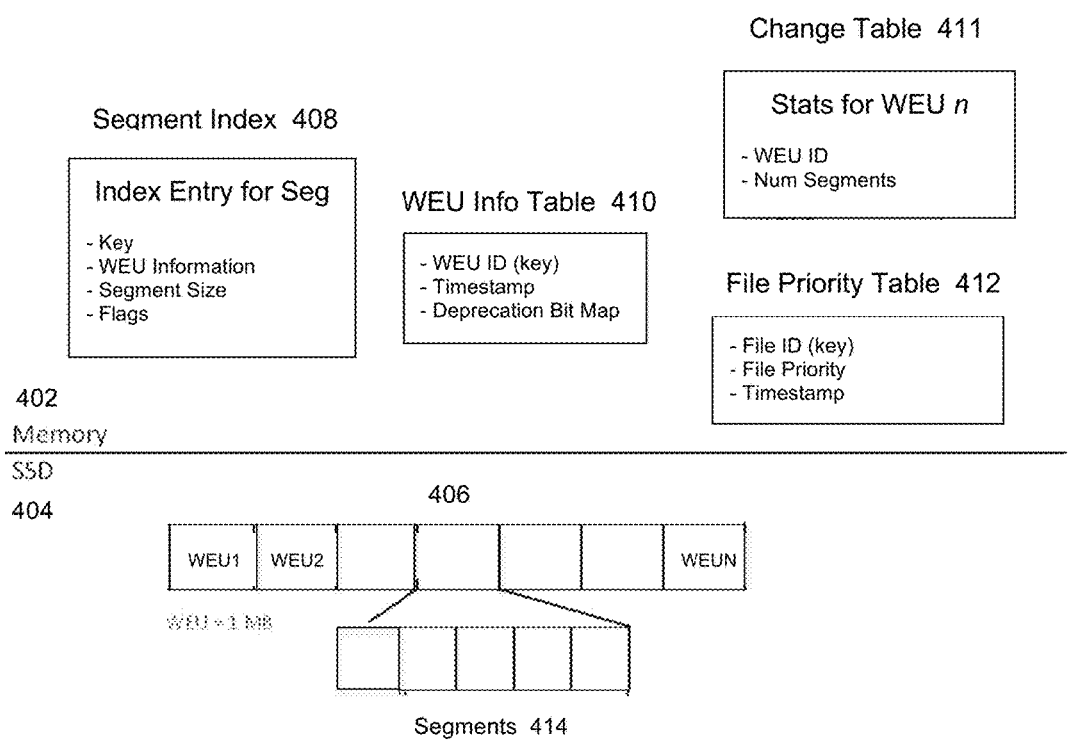
FIG. 4 illustrates a flash cache implemented as part of the Data Domain operating system and that has certain cache eviction properties that can be checkpointed under some embodiments.

For deduplication backup systems, the duplicate count status (table entry 15) indicates the number of times a segment is referenced by a file (i.e., is encoded as metadata), therefore reducing space requirements. It should be noted that Table 1 is an example of some information that can be compiled to generate the cache status information, and that other information items are also possible. With respect to the checkpointing process, the cache status information generally indicates which segments and WEUs to evict from the cache and which segments to keep. It has the additional characteristic of possibly changing frequently, so it is not a good candidate to update on flash, and is therefore saved in RAM 402 as shown in FIG. 4. The checkpoint allows a way to maintain this information without overly impacting the flash life span.

FIG. 4 illustrates a flash cache implemented as part of a Data Domain operating system and that has certain cache eviction properties that can be checkpointed under some embodiments. As shown in FIG. 4, the flash cache structure 406 is stored in non-volatile SSD memory 404. The cache status information is stored in RAM memory 402 and includes certain elements such as the segment index 408, and the WEU Info Table 410, which has cache status information that could be checkpointed to maintain the accuracy of the cache status. The timestamp is the last access time for any segments in the WEU, and the deprecation bitmap records which segments are valid versus invalid, or which are likely to be used or unlikely to be used in a cache indexed by fingerprint. FIG. 4 also shows a change table 411 and a file priority table 412 that maps from a file ID to its priority and last access time. The table entries for each of the relevant tables stored in memory 402 correspond to respective data elements in the cache structure 406. The example cache structure 406 comprises a number (N) WEUs, which are each of a certain size (e.g., 1 MB) and comprised of a number of segments 414, as shown for one of the units. Besides the segments, the WEUs may include other information such as headers, change table information, and so on. FIG. 4 is intended to be an example of a possible implementation of a flash cache data structure and cache status tables and may include some specific names for table entries, but embodiments are not so limited. Any other appropriate data structure or structures for the cache and the status information tables may be used. For example, data blocks may be used and referenced that refer to specific locations in flash, while WEU IDs are logical identifiers. In this case, the process may evict a WEU, free the space in the corresponding block, and write a new WEU to the block.

Figure 5:
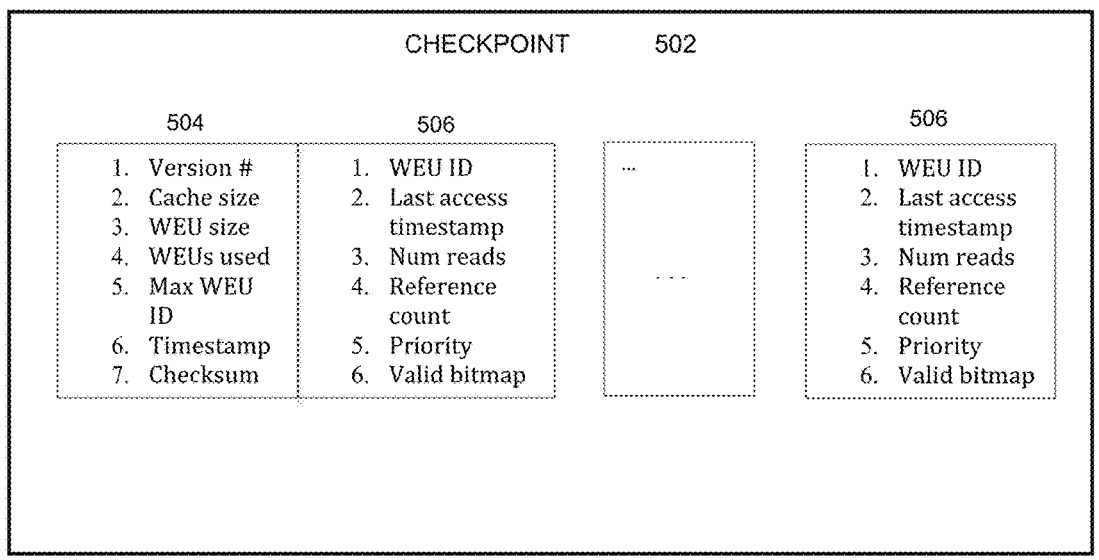
FIG. 5 illustrates an example checkpoint containing selected cache status information under some embodiments.

In an embodiment, the cache status information, which may be derived through different tables maintained by the cache manager as shown in FIG. 4, is compiled and maintained in a single table or table array. FIG. 5 illustrates an example checkpoint containing selected cache status information under some embodiments. Checkpoint 502 includes a number of different data structures that contain individual data elements as shown. A first table 504 represents a checkpoint header that includes certain configuration information such as sizes of the cache and WEUs and other information as shown. The checkpoint header also includes cache information including the max WEU ID written out and the version number to support format upgrades. The header 504 is followed by a number (N) of records 506, with one record per WEU in the cache. If a cache position is unoccupied, the WEU ID would be an invalid value such as 0. WEU ID numbers do not necessarily increase from left to right because eviction can replace any of the WEUs in any order, and there can be missing WEU IDs. The example configuration of checkpoint 502 represents what would be considered a "full" checkpoint in that complete cache status information is written persistently for all WEUs in the cache. The configuration can be modified through an optimization or compression scheme. For example, one optimization is to write a partial checkpoint consisting of a header record and the WEU entries that have been modified since the previous checkpoint. In the case of partial checkpoints, the process would write a full checkpoint followed by a sequence of partial checkpoints, and then start with another full checkpoint periodically. FIG. 5 illustrates one possible configuration according to an example implementation, and embodiments are not so limited, and many other configurations are possible. The data structure of FIG. 5 could exist in memory in the form shown and be updated based on client accesses, and then written out directly to persistent storage. Alternatively, the in-memory format may be different and it could be converted into the illustrated format for storage. For example, the process might keep a hash table mapping from WEU ID to a structure in memory that is converted to an array to be written out. Also, it might use an LRU list of WEUs in memory but store the access timestamps for the WEUs in the checkpoint form, such that it can recreate the LRU list when reloading a checkpoint.

The checkpoint may be stored in any of the available memory resources such as RAM 202, SSD 204, or HDD 206. Saving to HDD is possible because the checkpoint information is written asynchronously based on a defined schedule, so Read/Write latencies associated with HDD accesses do not present any particular problem. Likewise, because the amount of data saved in a checkpoint is relatively small and infrequently written, saving to SSD does not present any significant erasure issues. Since writing the checkpoint to RAM exposes the checkpoint to the same volatility as the original cache status information, it is generally preferable to write the checkpoint to the flash memory. In some implementations, portions of RAM's state may be protected by a battery system to provide persistence, in which case checkpointing to battery-protected RAM is possible.

Figure 6:
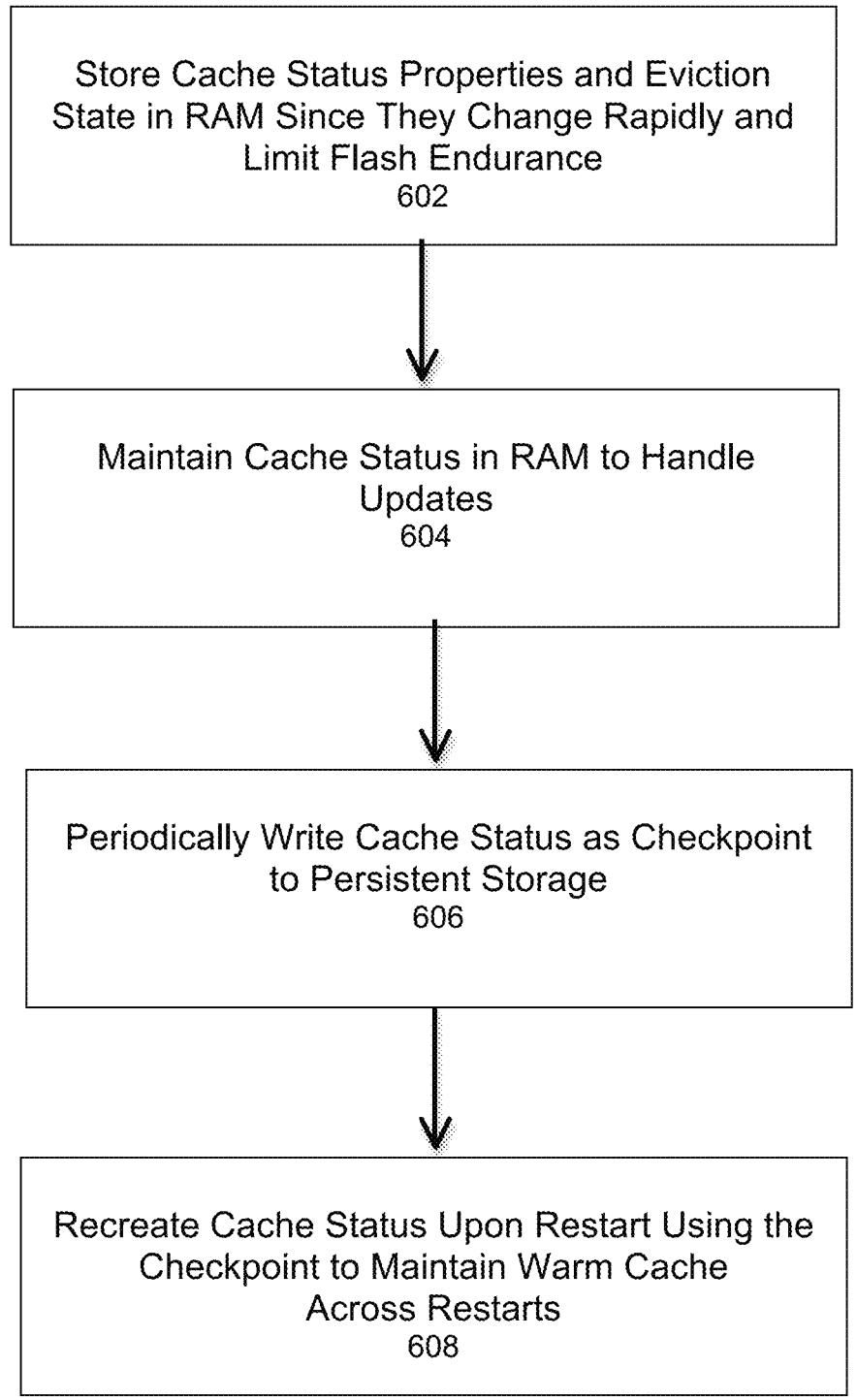
FIG. 6 is a flowchart that illustrates an overall method of maintaining a warm cache across restarts using a checkpointing process under some embodiments.

FIG. 6 is a flowchart that illustrates an overall method of maintaining a warm cache across restarts using a checkpointing process under some embodiments. As described above with reference to FIG. 4, cache status properties (or cache eviction states) change rapidly and are stored in RAM memory since they should not be written to flash due to limited erasure life span, and they should not be written to disk because of the latency associated with HDD random I/O, block 602. The cache status is maintained in RAM to handle the updates to the WEUs and other data elements of the cache, block 604. On a periodic basis, a checkpoint (e.g., checkpoint 502) is generated and stored in persistent (non-volatile) memory, such as the flash (SSD) memory or the HDD memory, block 606. To maintain a warm cache across restarts, the cache status is recreated after a restart using the checkpoint, which is available immediately from the persistent memory. This allows the recreation of the cache status as it was saved prior to the shutdown. The checkpoint is essentially a snapshot of the cache status and eviction state just prior to shutdown (assuming a high enough checkpointing period) that is used to repopulate the cache status data elements in RAM so that the normal long re-population time for generating cache status information is not incurred.

Figure 7:
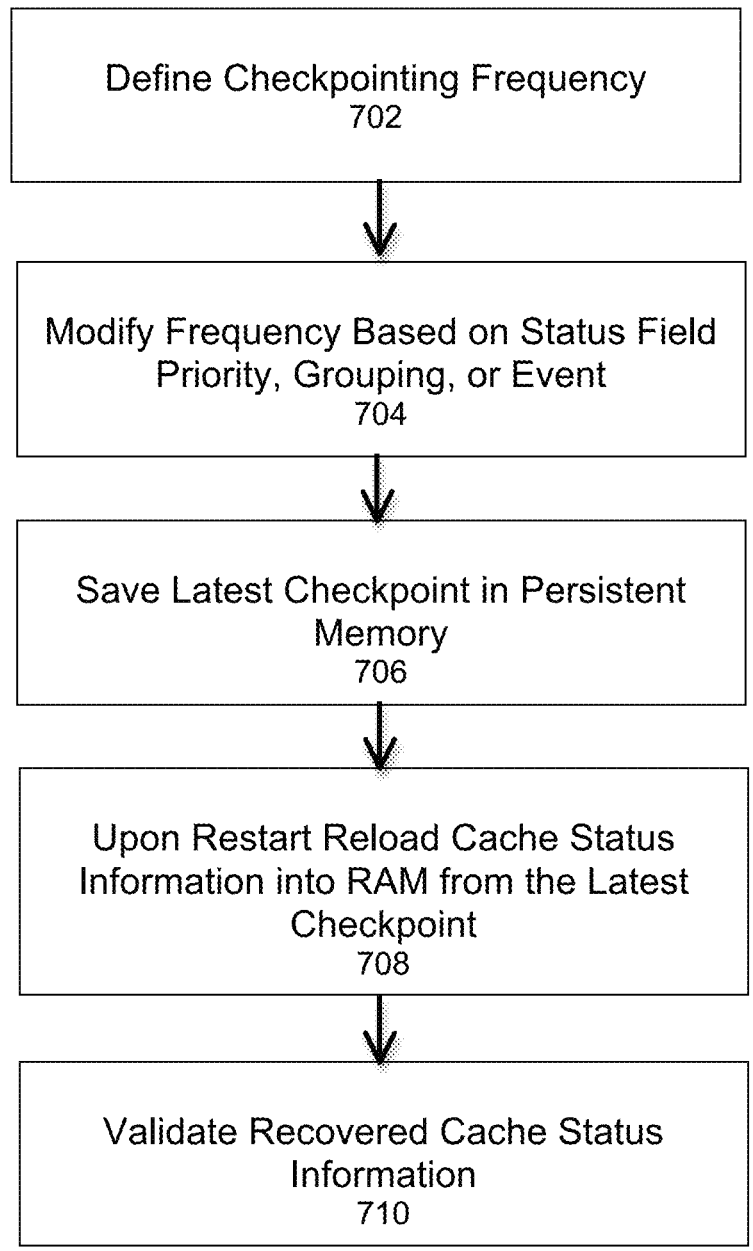
FIG. 7 is a flowchart that illustrates a method of performing checkpointing of cache status information, under some embodiments.

FIG. 7 is a flowchart that illustrates a method of checkpointing cache status information under some embodiments, such as by using the checkpoint structure of FIG. 5. A first step of the process is to define the checkpointing frequency, 702. The selection of checkpointing frequency generally represents a compromise between the warmth of the cache and the frequency of making checkpoints. More frequent checkpointing increases the warmth factor, but may impose excessive overhead and possibly impact flash life span if the checkpoints are written to the flash. In general, based on the rate of reading/writing data to flash, it can be calculated how frequently to checkpoint cache information. The frequency can be calculated in several ways, such as on a regular schedule (e.g., once per hour, once per day, etc.); or when a certain amount of data is written to flash; or when a certain fraction of cache status information has been updated, among other similar ways.

In an embodiment, the frequency is based on design properties of the cache. For example, it may be known that the selected SSDs are designed to support 3 overwrites per day or any other value specified by the SSD manufacturer. To maintain the property that the cache status information is not more than 10% cold (for example), the process can approximate this by checkpointing whenever 10% of the cache has been written. A lower bound on this time is calculated by assuming the maximum write throughput (in this example 3 per day) so this would indicate we should checkpoint every 48 minutes because 24 hours/3*0.1=48 minutes. This assumes that the clients are writing at the maximum write rate that would generate three full over-writes per day. For this example, a checkpoint would be saved every 48 minutes so that the cache eviction status is 90% up to date. While the above example calculation was based on time, it could be calculated based on number of cache accesses between checkpoints if that is known. For example, when 10% of the cache has been read or written, the process could checkpoint cache status information. Another example is to track the fraction of cache status information that has changed, and when that reaches a threshold, it should be checkpointed. Updates to the same WEU cache status information are only counted once per checkpoint in this example, which is discussed in further detail below. The checkpoint frequency is usually defined within the system as a set parameter, however, it may be provided as a user configurable parameter depending on system configuration.

The example calculation above provides a checkpointing frequency based on certain parameters such as SSD write throughput and the amount of correctness desired (e.g., 90% correct). This can be considered a baseline frequency that may be modified by additional parameters. For example, some cache status fields are more important and should be checkpointed more frequently, such as the valid/invalid status. In this case, certain record types within the cache status may be deemed more valuable than others (e.g., invalidation status is more valuable than last access time) so changes to more important fields will trigger a checkpoint operation more quickly than changes to less important fields. Another optimization or change of the checkpointing frequency may be made if certain status is updated frequently on the same block then those updates should be grouped to only count as a single access. For example if the same block is accessed many times the LRU timestamp will be updated many times, but they are all near the most recent value so the updates can be grouped and the checkpointing of status information can be delayed slightly on account of this. Thus, the process may delay checkpointing if there are frequent updates to a field until the updates stop or slow, up to a threshold amount of time. Likewise, a checkpoint may be accelerated by being written automatically upon the occurrence of an event, such as a controlled or deliberate shutdown, or an alarm or error indicating a potential emergency shutdown. This is shown in FIG. 7 as step 704 wherein the checkpointing frequency is modified (i.e., delayed or accelerated) for one or more checkpoints based on the priority, grouping, event occurrence, or any other similar effect.

As shown in block 706, the latest checkpoint is stored in a persistent location, such as the SSD, although the HDD may also be used. To ensure data redundancy, multiple checkpoints may be saved with each checkpoint time-stamped so that the latest valid checkpoint can be readily identified and accessed.

Upon a system shutdown and restart, the RAM memory will be erased and the cache status information will be cleared. Upon restart, the cache manager will load the latest checkpoint and rebuild the in-memory structures for the cache configuration and cache status, step 708. The properties may lag the true cache status, but this is generally acceptable for a cache. The location for checkpointing may be SSD or potentially HDD since it will be written and read sequentially, and checkpointing performance is likely not a bottleneck for periodic checkpoint operations. Thus, the cache status is rebuilt when the system restarts by simply loading the last cache status checkpoint. The system can confirm the cache status is valid with checksums over the records, block 710. When compiling the checkpoint records, a checksum is calculated over the checkpoint. The checksum could be calculated using any appropriate algorithm, such as Adler-32, CRC32, SHA1, or other algorithms. When reloading a checkpoint, the same algorithm is used to recalculate a checksum, which is compared to the checksum stored in the checkpoint itself. If the checksums match, the checkpoint is considered valid. Otherwise, the checkpoint is considered corrupted, and the system either uses a previous, valid checkpoint, or uses default cache status information. The multiple checkpoints mentioned above can be kept for rollback purposes.

On a crash recovery, the last checkpointed version can be loaded and then brought up-to-date by scanning the on-SSD WEU entries to remove cache status records that are inaccurate, such as with mismatching WEU IDs. Any WEUs created since the last checkpoint can be determined from scanning another logging structure (e.g., a change log), and new records can be added to the cache status with default settings. In this case, the process scans the WEU headers from flash and removes any missing headers from the in-memory records. Mismatching WEUs indicate WEUs overwritten in flash but without cache status information checkpointed. Newly written WEUs in flash can be added to the cache status information.

The valid/invalid status is important for correctness of cache results in the case of a crash recovery. It may be protected by NVRAM or other mechanisms outside of the cache control. If the key is a fingerprint, then invalidation may be a hint, such that a fingerprint match can always be returned. If all overwrites are cached, then a later version will be in a WEU with a higher ID number, and the older version can be marked as invalid. For deleted files, the process could write out an invalidation record for each data entry in flash or a global invalidation record for the file until all cache entries are removed.

Figure 8:
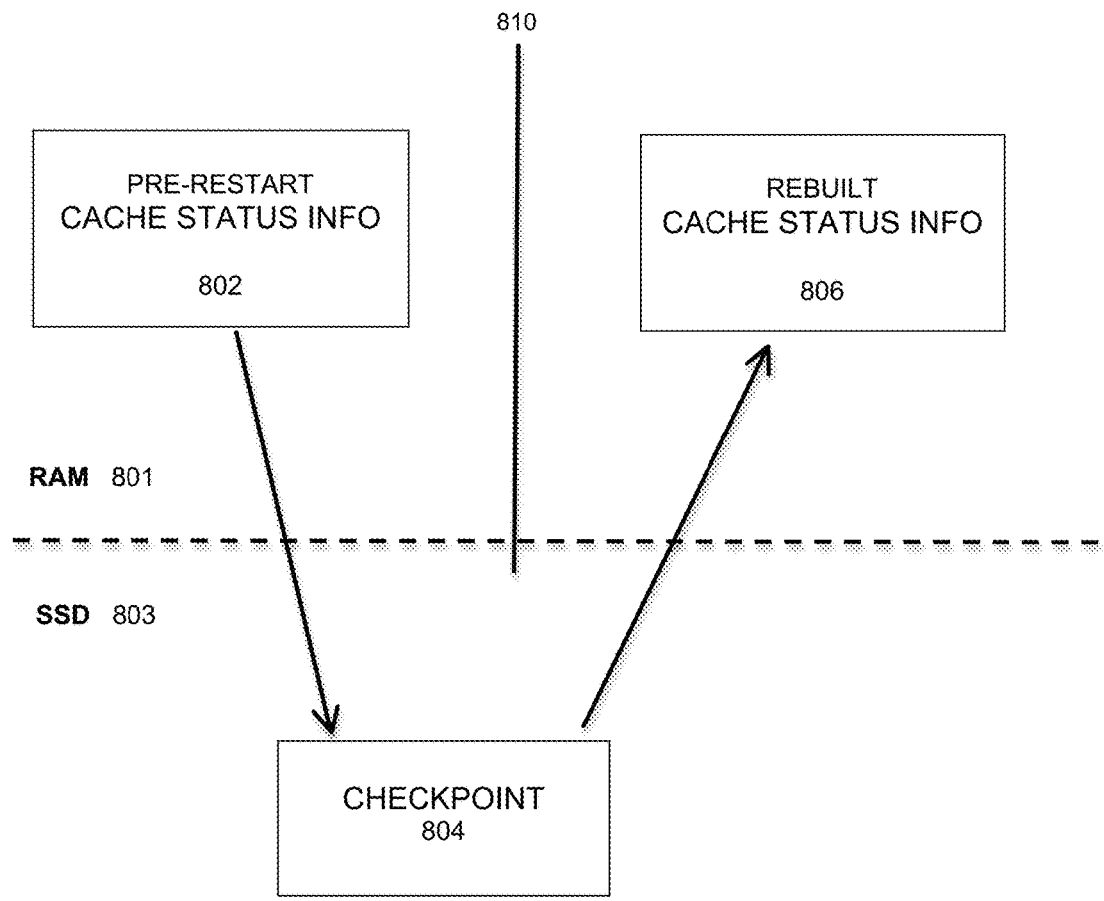
FIG. 8 illustrates a simple representation of the cache status information rebuilding process, under some embodiments.

FIG. 8 illustrates a simple representation of the cache status information rebuilding process, under some embodiments. FIG. 8 illustrates the cache status information 802 stored in RAM 801 and in a particular state just before a shutdown 810. Prior to shutdown and on a periodic basis, the information from 802 is compiled and saved in SSD (or HDD) 803 as a checkpoint. Upon restart, the cache status is cleared which causes the system to not know which WEUs are best to evict. In present systems it could take many hours (or days) to reload the cache with useful information. Using the checkpoint, the saved status information can be loaded right after restart so that the cache status information 806 is quickly rebuilt, and thus cache warmness is maintained across the restart 801. Unlike a method in which all cache status changes are written to flash as they occur, the periodic checkpointing does not cause a high erasure rate, and thus does not impact the life span of the SSD.

Reference in the specification to "one embodiment" or "an embodiment" means that a particular feature, structure, or characteristic described in conjunction with the embodiment can be included in at least one embodiment of the invention. The use of the phrase "in one embodiment" in various places in the specification do not necessarily all refer to the same embodiment.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of maintaining cache status information for a cache after a system restart following a shutdown, comprising:

defining a cache manager storing cache status information in RAM memory;

defining a cache stored in non-volatile flash memory having a defined life cycle based on a finite number of specified writes per unit of time;

periodically gathering the cache status information from one or more data structures of the cache manager and comprising cache eviction states and configuration information;

storing the configuration information in long-term disk memory;

determining a checkpointing frequency balancing warmness of the cache against the life cycle of the flash memory;

compiling individual data elements comprising the gathered cache status information into a checkpoint stored in the flash memory per the checkpointing frequency, the checkpoint comprising a number of write evict unit (WEU) records following a checkpoint header having certain configuration and eviction state information, and that is either a full or partial checkpoint depending on whether all or some WEU records have been modified since a previous checkpoint; and upon the system restart, loading individual data elements of the checkpoint into the one or more data structures in the RAM memory to restore the cache status information to a state just prior to the shutdown to maintain warmness of the cache across the restart.

2. The method of claim 1 wherein the restored cache status information is used by the system to make informed write eviction decisions to maintain correctness of the system after the restart relative to the state just prior to the shutdown.

3. The method of claim 1 wherein the cache comprises a flash cache stored in a solid-state disk (SSD) drive of the system.

4. The method of claim 3 wherein the cache status information comprises individual data elements including at least one of: valid/invalid status of cache data, Least Recently Used status of data segments in the cache, access counts for the data segments, priority status of the data segments, and duplicate counts of the data segments with respect to a deduplication backup process executed on the data by the system.

5. The method of claim 4 further comprising writing the individual data elements of the cache status information into cache status fields saved in the checkpoint.

6. The method of claim 5 wherein the checkpoint is compiled on a periodic basis corresponding to the cache status information gathering, and wherein the period is calculated based on at least one of: a regular defined schedule, a minimum amount of data written to the cache, and a minimum fraction of cache status information being updated.

7. The method of claim 6 wherein the period is calculated based on a maximum number of overwrites allowed per day of the SSD device storing the cache as specified by a manufacturer of the SSD device and a desired correctness of the cache data.

8. The method of claim 6 wherein the periodic basis may be modified by one or more of: a relative priority given to a cache status field relative to other of the cache status fields, a frequency of updates to a specific cache status field, and an occurrence of a defined event causing the shutdown, and wherein the valid/invalid status is assigned a higher priority to increase the checkpointing frequency of the valid/invalid status relative to other cache status fields.

9. The method of claim 1 further comprising validating the restored cache status information using checksums over records kept for data segments in the cache.

10. A method of maintaining, across system restarts, warmth of a cache stored in flash memory in the system, the method comprising:
   determining a checkpointing frequency balancing warmness of the cache against the life cycle of the flash memory
   obtaining valid/invalid status of data segments stored in the cache from write evict units maintained in RAM memory by a cache manager coupled to the cache and updated by the cache manager on a periodic basis defined by the checkpointing frequency;
   obtaining efficiency properties of the cache from other data elements of the cache manager and stored in long-term disk memory;
   compiling the valid/invalid status and the efficiency properties from the RAM memory and the long-term disk memory into a checkpoint that is saved to flash memory having a limited erasure threshold per the checkpointing frequency, the checkpoint comprising a number of write evict unit (WEU) records following a checkpoint header having certain configuration and eviction state information, and that is either a full or partial checkpoint depending on whether all or some WEU records have been modified since a previous checkpoint; and
   upon restart of the system, loading the checkpoint into the RAM memory space of the write evict units and the other data elements of the since cleared cache manager, to allow the cache manager to make informed write eviction decisions to maintain correctness of the system after the restart.

11. The method of claim 10 wherein the efficiency properties include at least one of: access counts of the data segments, priority status of the data segments, and data duplication counts of the data segments.

12. The method of claim 10 wherein the cache is stored in a solid state disk (SSD) drive of the system.

13. The method of claim 12 further comprising writing individual data elements of the valid/invalid status and efficiency properties as cache status properties into corresponding status fields saved in the checkpoint as a data structure.

14. The method of claim 13 wherein the checkpointing frequency is calculated based on at least one of: a regular defined schedule, a minimum amount of data written to the cache, and a minimum fraction of cache status information being updated.

15. The method of claim 14 wherein the checkpointing frequency is calculated based on a maximum number of overwrites allowed per day of the SSD device storing the cache as specified by a manufacturer of the SSD device and a desired correctness of the cache data.

16. The method of claim 15 wherein the periodic basis may be modified by one or more of: a relative priority given to a cache status field relative to other of the cache status fields, a frequency of updates to a specific cache status field, and an occurrence of a defined event causing the shutdown.

17. A computer program product, comprising a non-transitory computer-readable medium having a computer-readable program code embodied therein, the computer-readable program code adapted to be executed by one or more processors to maintain cache status information for a cache after a system restart following a shutdown, by executing instructions implementing a method comprising:
   defining a cache manager storing cache status information in RAM memory;
   defining a cache stored in non-volatile flash memory having a defined life cycle based on a finite number of specified writes per unit of time;
   periodically gathering the cache status information from one or more data structures of the cache manager and comprising cache eviction states and configuration information;
   storing the configuration information in long-term disk memory;
   determining a checkpointing frequency balancing warmness of the cache against the life cycle of the flash memory;
   compiling individual data elements comprising the gathered cache status information into a checkpoint stored in the flash memory per the checkpointing frequency, the checkpoint comprising a number of write evict unit (WEU) records following a checkpoint header having certain configuration and eviction state information, and that is either a full or partial checkpoint depending on whether all or some WEU records have been modified since a previous checkpoint; and upon the system restart, loading individual data elements of the checkpoint into the one or more data structures in the RAM memory to restore the cache status information to a state just prior to the shutdown to maintain warmness of the cache across the restart, wherein the restored cache status information is used by the system to make informed write eviction decisions to maintain correctness of the system after the restart relative to the state just prior to the shutdown.

* * * * *